INVENTOR
LESTER A. AMTSBERG.
ATTORNEY

AT END OF ENGAGING ACTION

AT POINT OF IMPACT

AT RELEASE POINT

AT START OF ENGAGING ACTION

INVENTOR
LESTER A. AMTSBERG
BY
Raymond G. Mullee
ATTORNEY

April 14, 1959

L. A. AMTSBERG 2,881,884

IMPACT CLUTCH

Filed Jan. 12, 1955

INVENTOR
LESTER A. AMTSBERG.
BY
Raymond G. Miller
ATTORNEY

United States Patent Office 2,881,884
Patented Apr. 14, 1959

2,881,884
IMPACT CLUTCH

Lester A. Amtsberg, Utica, N.Y., assignor to Chicago Pneumatic Tool Company, New York, N.Y., a corporation of New Jersey Application January 12, 1955, Serial No. 481,391

26 Claims. (Cl. 192—30.5)

This invention relates to tools for operating upon threaded fasteners and the like, and more particularly to improvements in an impact clutch for use in such tools.

My prior patent application Serial No. 365,796, filed July 3, 1953, now Patent 2,825,436 granted March 4, 1958, discloses a tool having an impact clutch which in general incorporates certain operating principles generic to the forms of invention set forth herein. Basically, the forms of impact clutches set forth in this application, as well as in my prior application, include arrangements whereby kinetic energy of an inertia member is used to rotate a threaded fastener element, the utilization of such kinetic energy taking place in two steps, namely: (1) a run-up period wherein a portion of the kinetic energy of the inertia member is applied, in a continuous manner to an anvil which engages the threaded fastener, (2) a setting period wherein the kinetic energy is applied in intermittent manner to the anvil, to provide an impacting effect, said second step commencing automatically upon realization of a predetermined load upon the anvil. The invention is concerned with the manner in which the kinetic energy of the inertia member is transmitted to the anvil; in the illustrations of embodiments of the invention, comprising a hammer element, a spindle, an anvil, a dog member, and a cam means, the latter serves the dual purpose of transmitting continuous torque from the hammer element to the anvil during the first step as above described, and for moving the dog member into intermittent engagement with the anvil during the second step in the operation of the impact clutch. A basic difference between my prior application and this application is in the structure and arrangement of the cam means.

The forms of invention disclosed herein represent what may be considered an improvement over the structure disclosed in said prior application, insofar as they provide forms of structure which are simplified, and hence less costly to manufacture. More particularly, the forms of inventions disclosed herein illustrate structural arrangements, which among other things, have lower friction loss characteristics as compared with the structure set forth in my prior application, as well as in other forms of impact clutches found in the prior art. The impact clutch of the invention includes roller, or anti-friction cams, as compared with friction cams in the device of applicant's prior application; also in one embodiment, the spindle reciprocates in unison with the dog, whereas in the device of applicant's prior application, the spindle is held against axial movement relative to the hammer. Further differences are that in the device of the present invention, the driving cams are on the hammer, while in the device of applicant's prior invention, the driving cams are on the dog. These and further differences will be apparent from an understanding of the respective disclosures.

The main object of this invention is to provide a tool with an impact clutch having improved operating characteristics including light weight, simple construction, low frictional losses, and better lubrication maintenance.

These and further objects and features of the invention will become more apparent from the following description when considered with the accompanying drawings, which show three alternative forms of invention (Figs. 1–18, Figs. 19–42 and Figs. 43, 44) and in which.

Figure 15:
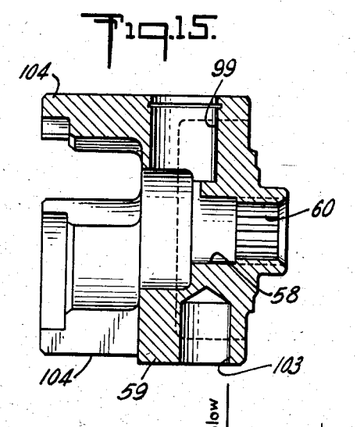
Fig. 15 is a section view of the hammer element as seen from line 15—15 in Fig. 14.
Figure 16:
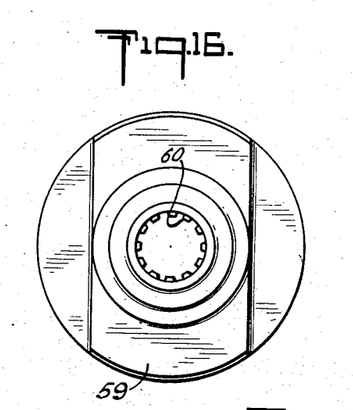
Fig. 16 is a side view in elevation of the rear face of the hammer element.
Figure 17:
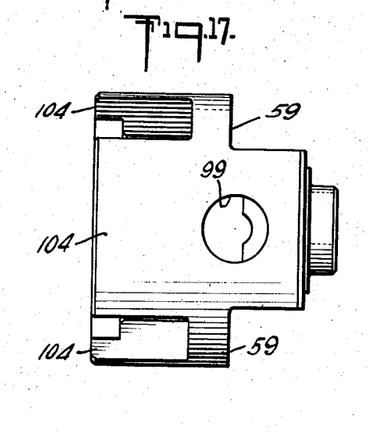
Fig. 17 is a plan view of the hammer element.

Referring now to the drawings, and more particularly to Figs. 1 to 17, numeral 51 indicates a housing, or casing, which encloses an impact clutch assembly illustrative of an embodiment of the invention. The casing 51 is affixed to a motor housing 52, which encloses a motor means 53 of the pneumatic type, it being understood however, that another type of motor means, may be satisfactory. The motor means includes a shaft 54 which projects from the motor housing 52, and which is supported therein by a ball bearing 56. Motor shaft 54 has a splined portion 57 at its front end, which enters into a counterbore 58 formed in a hammer element 59, and engages a complementary splined portion 60 adjacent counterbore 58 (Fig. 15), whereby the hammer element and motor shaft are directly coupled. The hammer element 59 is supported at its rearward end by a ball bearing 61 which is mounted in the motor housing 52. Slidably supported at its rear end within the bore 58, is a spindle 62 the forward part of which extends into a bore 63 formed in an anvil 64, the latter of which is positioned for rotary motion in the forward end of the housing 51. A sleeve 66 supports the anvil in operative position.

A plurality of pins 71 are arranged in longitudinal slots 72 formed in the anvil bore 63 and in longitudinal slots 73 formed on the periphery of the spindle 62, the slots 73 being wider (Fig. 7) than the diameter of pins 71 so that slight rotational movement or lost motion between the spindle and anvil is afforded, for reasons of which will later be explained.

The spindle has two bores 74, 76 separated by a wall 77 which has a hole 78 slidingly supporting a thrust rod 79 extending throughout the length of bores 74, 76. The thrust rod 79 is fitted with a flange 81 which shoulders against the ends of the spline teeth 60 of the hammer element 59 whereby the thrust rod is effective to restrict rearward movement of the anvil 64. A helical spring 82 surrounds the thrust rod within the bore 76, and is maintained at all times under compression between the end of the anvil bore 63 and wall 77 of the spindle so that the latter is constantly urged in a rearward direction.

Figures 1, 2, 3:
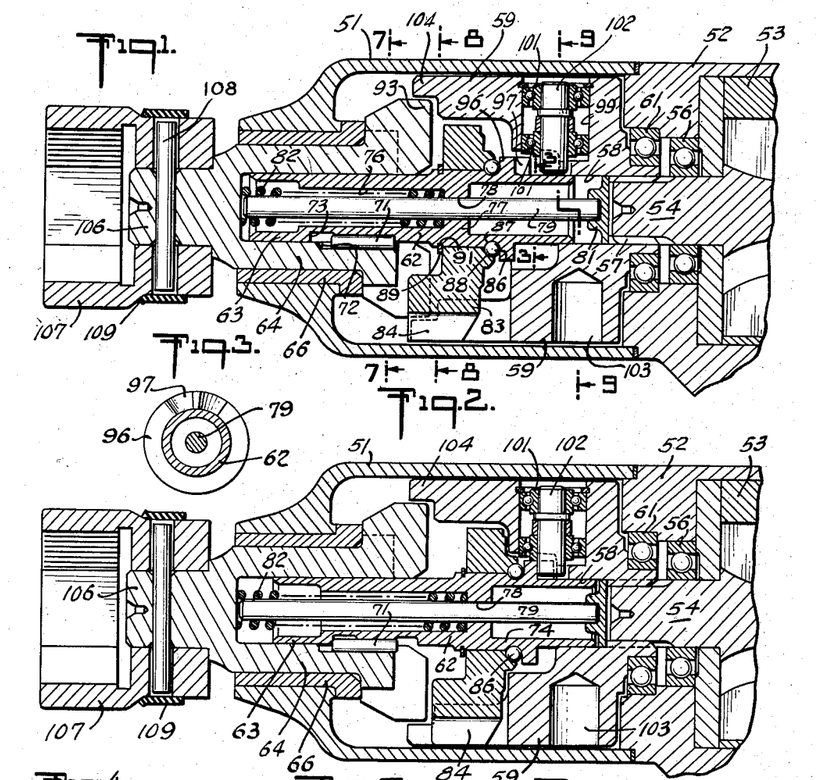
Fig. 1 is a longitudinal section view of a tool embodying features of the invention, and showing the relative position of various parts at time of impact.
Fig. 2 is a longitudinal section view of the tool of Fig. 1 and showing the relative position of the parts prior to impacting or during the interval between impacts.
Fig. 3 is a rear end view of a cam element as seen from line 3—3 in Fig. 1.

Mounted for rotary motion upon the spindle 62, is a dog element 83, which has three equi-spaced fingers, or jaws 84, extending forwardly in the direction of the anvil 64. The dog member is maintained against axial movement in a rearward direction relative to spindle 62 by a plurality of balls 86 at the rear end of the dog member which balls ride in a raceway, a portion 87 which is formed upon the spindle and another portion 88 which formed in the dog member. The latter is maintained against axial movement in a forward direction relative to spindle 62 by means of a snap ring 89 which is positioned in a groove 91 on the spindle, and which engages the front face of the dog member. The jaws 84 are arranged for engagement with three equi-spaced jaws 93 formed on the rear part of the anvil 64, when the spindle 62 and dog 83 are in forward, or operative, position as shown in Fig. 1. The jaws 84 have engagement surfaces 94 (Figs. 8 and 11) which converge to form an included angle of approximately 70°, such arrangement providing an engagement surface between each driving jaw 84 and driven anvil jaw 93.

Figure 4:
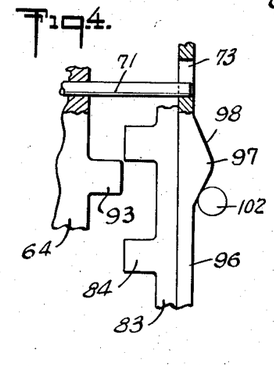
Fig. 4 is a fragmentary development, corresponding to the Fig. 2 position, showing the driving connection between the roller cam, spindle, pin and anvil, with the impact jaws out of engagement.
Figure 5:
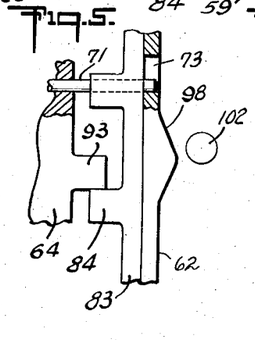
Fig. 5 is a view similar to Fig. 4 but showing the parts in the Fig. 1 position, that is, at instant of impact.
Figure 6:
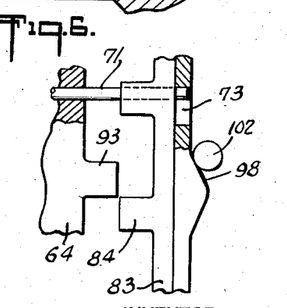
Fig. 6 is a view similar to Fig. 4 but showing the relative position of the parts after an impact blow has been delivered and just after the dog has separated from the anvil.
Figure 8:
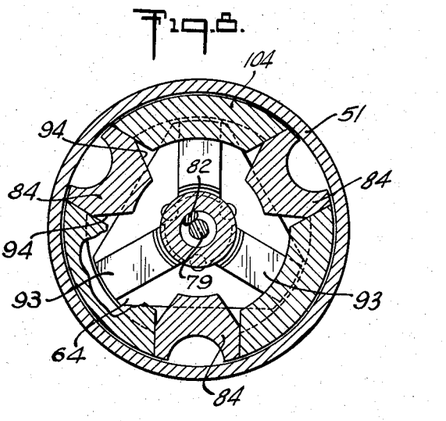
Fig. 8 is a cross-sectional view as seen from line 8—8 in Fig. 1, with the hammer jaws out of engagement with the anvil.
Figure 9:
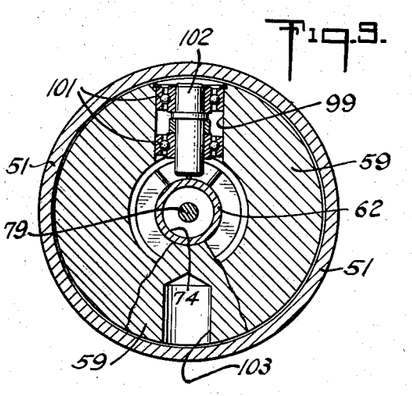
Fig. 9 is a cross-sectional view as seen from line 9—9 in Fig. 1.
Figure 10:
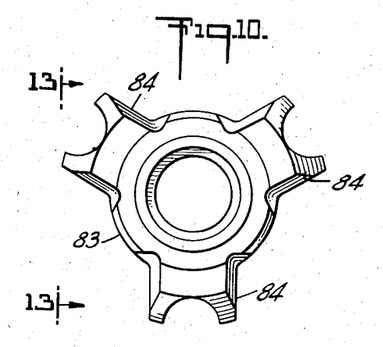
Fig. 10 is an elevational view of the rear face of a dog member forming part of an impact clutch of the tool of Fig. 1.
Figure 11:
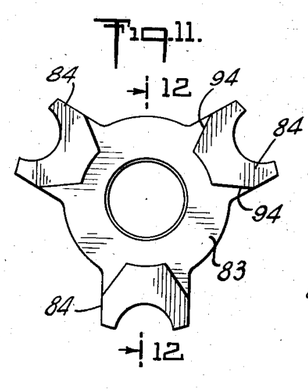
Fig. 11 is an elevational view of the front face of the dog member of Fig. 10.
Figures 12, 13:
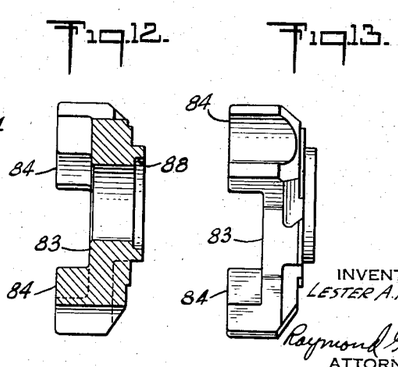
Fig. 12 is a sectional view of the dog member as seen from line 12—12 in Fig. 11.
Fig. 13 is a side elevation of the dog member.
Figure 14:
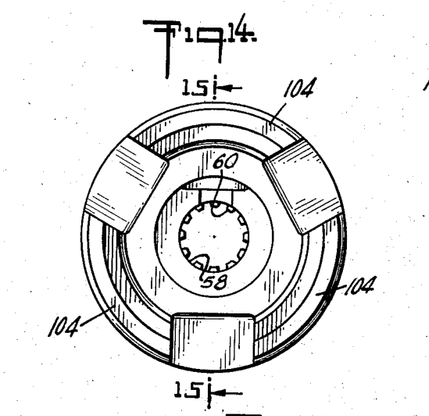
Fig. 14 is a view in elevation of the front face of a hammer element forming part of the impact clutch of the tool of Fig. 1.

Rearwardly of the dog 83, the spindle has integrally formed upon its periphery a shoulder 96, on which is a cam portion 97, having cam surfaces 98 converging in a rearward direction (Figs. 3 and 4). The hammer element 59 has a radial bore 99 which supportingly receives a pair of ball bearings 101, the latter of which positionally maintain a roller cam 102. The inner end of the roller cam 102 is in close proximity to the spindle 62, so that the roller cam is engageable with the spindle cam surfaces 98 whereby the spindle and dog 83, may be forced forwardly, for engagement of the dog jaws 84 and anvil jaws 93. A radial bore 103 is provided in the hammer element opposite bore 99 to assure balanced rotation of the hammer element, as will be understood. The hammer element 59 has three equi-spaced forwardly extending portions 104 which are adapted to interlockingly and slidingly receive the jaws 84 of the dog 83, as best seen in Fig. 8. The interlocking engagement between the hammer element 59 and the dog 83 provides a forward end support for the hammer element, the rearward end support, viz bearing 61, having already been described.

The forward end of the anvil 64 has a square cross-section shank 106 which is adapted to receive a socket 107 maintained on the shank by a pin 108, the latter being kept in position by means of a rubber ring 109 which encircles the socket as shown.

From the description above it will be seen that the impact clutch is formed of certain basic parts including a hammer element 59 rotatable by a motor shaft 53, a dog 83 rotatably mounted upon a spindle 62 and movable axially in unison therewith, the dog 83 being coupled for rotary movement in unison with the hammer element 59, and an anvil 64 arranged for rotational movement and slidably supporting the forward end of the spindle. The hammer element 59 has a radially disposed roller cam 102 which is arranged to engage a cam surface 97 formed upon the spindle 62 whereby the latter is urged forwardly so that jaws 84 of the dog 83 will be engageable with jaws 93 formed on the anvil 64. Since all operative parts are symmetrically arranged, the impact clutch will operate equally well in either direction of rotation.

The operation of the impact clutch shown in Figs. 1–17 will now be described. Considering the position of the parts as in Fig. 2, and assuming that the tool operator has placed socket 107 into engagement with a fastenable means, such as a nut (not shown), and the motor 53 is operating thereby rotating the motor shaft 54, the hammer element 59 will be rotated, and contact will be made between the roller cam 102 and the spindle cam portion 97. Prior to such contact, no rotary motion will be applied to the spindle 62, with the exception of a slight frictional drag caused by the rotary motion of the dog 83 upon the spindle, as well as the rolling engagement between the roller 102 and flat surface of the cam portion 97, which action is desirable for eliminating lost motion in the drive action. After contact between the roller cam 102 and the spindle cam portion 97 is made, the spindle 62 will be rotated resulting in the rotation of the anvil 64, by virtue of pin connection 71 between the spindle and anvil, and the turning of the socket 107 and the engaged nut. During the early part of the nut running-up stage, resistance to rotation is generally low and rotary motion of the spindle will be effected solely by engagement between the roller cam 102 and the spindle cam portion 97. The tendency of the spindle to be moved forwardly due to the axial component of force resulting from the slope of spindle cam portion 97, will be offset by the resistance of the pre-compressed spring 82, during this early stage of nut running-up.

As resistance to rotation of the nut increases, the torque delivered through cams 102 and 97 will increase, and the axial component of the force on the cam portion 97 will correspondingly increase, until it is sufficient to overcome the pre-compressed spring 82. Thereupon, the spindle 62 will be urged forwardly thereby further compressing the spring 82. Since the dog 83 is coupled to the spindle for axial movement therewith, the dog will likewise move forwardly and the jaws 84 will be moved into the annular path of the anvil jaws 93. As the nut is set, resistance to rotation thereof abruptly rises, causing a phase difference between the rotation of the hammer 59, and the anvil 64, i.e., the anvil rotation decreases in a relative sense with respect to the hammer rotation. As a result thereof, the roller cam 102 rides over the crest of cam surface 97, thereby momentarily terminating cam engagement and causing an initial impact. The spring 82 now is unoposed, and the spindle 62 and dog 83 will be moved rearwardly, thereby removing the dog jaws 84 from the annular path of the anvil jaws 93. During the abrupt rise in resistance to rotation, the hammer was decelerated; after the roller cam 102 passes over the crest of cam surface 97, the hammer is accelerated for almost one full revolution before the roller 102 re-engages cam surface 97. No forward movement of the spindle 62 takes place during said revolution of the hammer, because the roller 102 is in engagement with the flat part of the cam 96 i.e., forward movement can only be realized by engagement of the roller with cam surface 97. After termination of first forward movement of the spindle due to rotation resistance rise as above described, the roller cam 102 strikes the cam surface 97 at a high rotative speed and the spindle and dog are rapidly thrown forward. Before the spindle can move rearwardly, due to action of the spring 82, the dog jaws 84 strike the anvil jaws 93 (Fig. 5) resulting in the delivery of a rotative impact blow upon the engaged nut. At the instant of the impact blow, the frictional engagement between the dog and anvil jaws is sufficient to prevent the spring 82 from forcing the spindle rearwardly. The force of the impact blow being spent, friction between the jaws drops to permit the spring to move the spindle rearwardly to dis-engage said jaws. During such rearward movement the roller cam 102 engages the back slope 98 of the cam surface 97 to thereby rotate the spindle slightly, so that the cam surface 97 would not interfere with the rearward movement of the dog 83; such slight rotational movement of the spindle is possible because of the lost motion pin 71 and slot 73 arrangement, by which the anvil is mounted upon the spindle. While the lost motion may be dispensed with and still have an operative tool, it is preferable to incorporate the lost motion arrangement since, as has been pointed out, it prevents interference with rearward movement of dog 83.

It is to be noted that the roller 102 and cam 97 arrangement, assures that the slack in the anvil and spindle connection is taken up before impact, thus avoiding any attenuation of the force of impact blow. While a certain amount of spindle rotation force is attained by virtue of the engagement of the roller 102 with the spindle shoulder 96, the major part of spindle rotation prior to impact is caused by engagement of the roller 102 with cam surface 98. Thus a minimum loss of power is spent in taking up the slack in the driving connection. It will also be apparent that loss due to friction is maintained at a minimum because of the roller cam arrangement, and further because the dog is moved toward impacting engagement for only a relatively small degree of hammer rotation. In impact wrenches of the prior art, relatively high friction loads result from movement of operative member under stress, during a larger degree of rotation.

Figure 7:
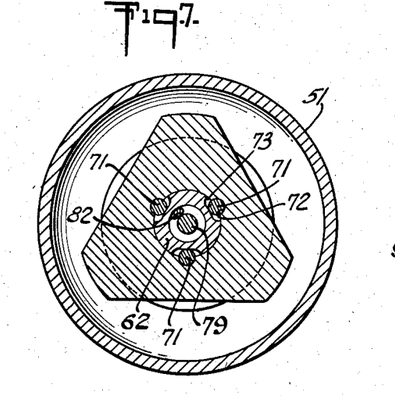
Fig. 7 is a cross-sectional view as seen from line 7—7 in Fig. 1, showing the lost-motion driving connection between the spindle and anvil.

Because the reengaging movement of the dog 83 occurs during only a small fractional part of a rotation, it is important to assure accurate correlation between the axial movement of the dog toward the anvil 64 and the rotative movement of the dog ahead of the anvil. Such correlation is provided in the present device with the result that the striking jaws 84 are always positively guided into full engagement with the anvil jaws 93. The driving cam 102 is carried by the hammer element 59 in a rotative sense, as it always revolves through the same number of degrees about the clutch axis as the hammer element. Similarly, the driven cam 96 is carried by the anvil 64 in a rotative sense, as it is drivingly connected to the anvil and is constrained to rotate in unison with the anvil except for a few degrees of lost motion of the pins 71 in the slots 73 (Fig. 7). Since the dog 83 is carried in rotation by the hammer element, it follows that the angular position of the dog relative to the anvil at any instant is always accompanied by a corresponding angular position of the roller cam 102 relative to the driven cam 97 on spindle 62.

Figure 18:
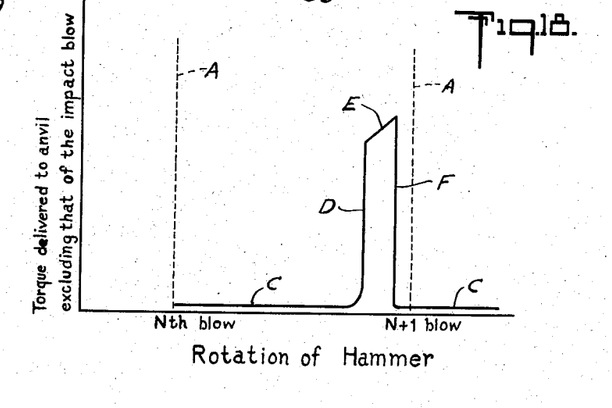
Fig. 18 is a graph representing certain operating characteristics of the tool of Fig. 1.

The graph in Fig. 18 depicts an analysis of the torque delivered to the anvil, exclusive of the impact blow, in the impact clutch described heretofore. The abscissa represents the degree of rotation of the hammer element, while the ordinate represents torque. Vertical dotted lines A indicate instant of impact blow, the distance therebetween being approximately 360° of hammer rotation. Horizontal portions C of the curve indicate torque delivered to the anvil due to drag on the spindle as the dog 83 turns on the spindle and roller cam 102 rides on the flat face of cam 96 between impacts. Curve portion D, which rises very sharply represents increase in torque as the roller cam 102 engages the cam surface 98, with the dog 83 still in rearmost position. The curve position E represents the torque delivered to the anvil as the roller cam 102 rolls on cam surface 98 to cause further compression of spring 82 as movement of the dog toward the anvil occurs. Curve portion F represents the instantaneous decrease in torque as the cam effect upon the spindle is terminated, Fig. 5. The curve diminishes to portion C indicating minimum torque delivered to the spindle just prior to, and following an impact blow upon the anvil by the dog. The graph of Fig. 18 is of interest insofar as it graphically illustrates the very small amount of energy expended in drag upon the spindle, as dog rotates thereabout. While a certain amount of drag is desirable to remove lost motion in the wrench socket connection driven by an impact clutch, it is believed that some of the impact clutches of the prior art are open to criticism because the drag associated with such clutches is of such intensity and duration as to impair the overall operating efficiency of the clutch. In the present device, a substantial torque is delivered to the anvil between impacts only for a short duration just prior to impact as represented by the portions D and E on the curve.

The tool illustrated in Figs. 19–42 includes an impact clutch which has the same general operating principles as the impact clutch above described, however, the camming arrangement for the dog element relies upon a distinctly different type of camming structure. In the following description, the same identifying numerals will be used for identical parts as described heretofore.

Figure 19:
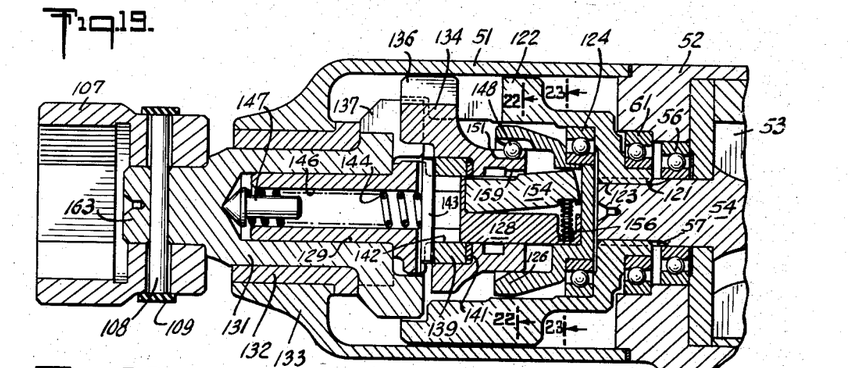
Fig. 19 is a sectional view of a tool embodying features of the invention, and representing a variation of the tool of Fig. 1, and showing the relative position of parts just prior to impact.
Figure 20:
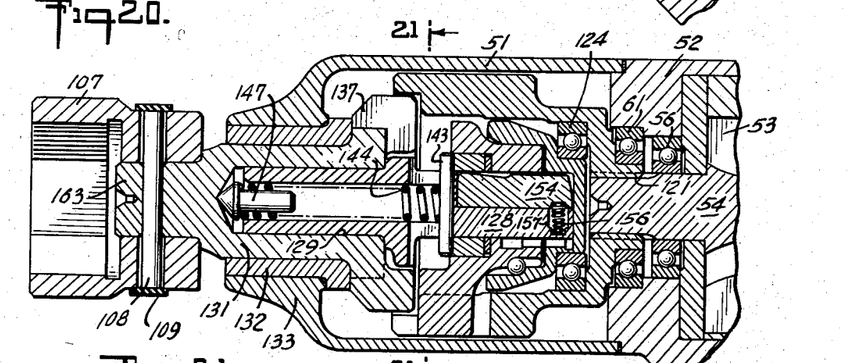
Fig. 20 is a longitudinal section view of the tool of Fig. 19 and showing the relative position of the parts prior to impacting or during the interval between impacts.

Referring more particularly to Fig. 19, the tool comprises the housing, or casing 51, which encloses the impact clutch assembly of the invention. The casing 51 is affixed to the motor housing 52, which encloses the motor means 53, having drive shaft 54 projecting therefrom, the latter of which is supported by ball bearing 56 in the housing 52. The end of motor shaft 54 having splined portion 57, enters into a bore 121 formed in a hammer element 122, and engages a complementary splined portion 123, formed in the bore 121, whereby the hammer element and motor shaft are directly coupled. The hammer element 122 is supported at its rearward end by ball bearing 61, which is mounted in the motor housing 52.

A ball bearing 124 is arranged within the hammer element 122 for the rotational support of a cam element 126. Extending within a bore 127 formed in the cam element 126 and rotatably supported therein, is an end of a spindle 128, the forward portion of which is slidingly arranged in a bore 129 of an anvil 131, the latter being rotatably supported in a sleeve 132 mounted in a nose portion 133 of the casing 51. Mounted for rotary and longitudinal movement upon the spindle 128 is a dog member 134, which has three equi-spaced fingers, or impact jaws 136, extending forwardly in the direction of the anvil 131. The impact jaws 136 are arranged for engagement with three equi-spaced jaws 137 formed on the rear part of the anvil 131, when the dog 134 is in forward, or operative position as shown in Fig. 19. The jaws 136 have engagement surfaces 138 (Fig. 21) which converge to form an included angle of approximately 70°, such arrangement providing an engagement area between each jaw 136 and anvil jaw 137. A bushing 139 is interposed between the dog 134 and spindle 128, the rear end of the bushing engaging a thrust washer 141 which is seated with the dog. The spindle has a longitudinal slot 142 which guidingly receives a pin 143 the ends of which engage the front end of the bushing 139. A helical spring 144 within a bore 146 of the spindle, is maintained under compression at all times between the pin 143 and a center piece 147, to thereby provide a steady force urging the dog 134 in a rearward direction.

Figures 21, 22, 24:
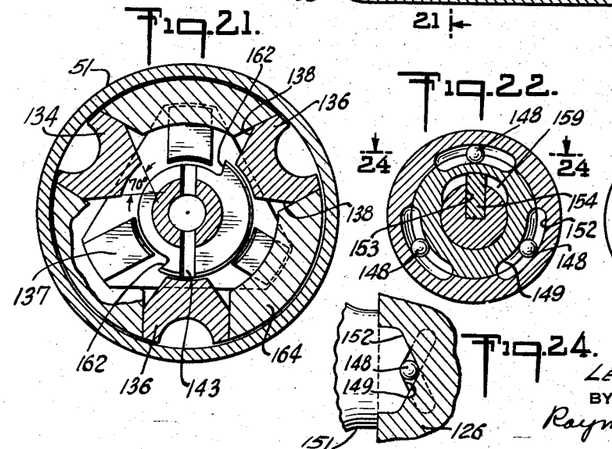
Fig. 21 is a cross-sectional view as seen from line 21—21 in Fig. 20.
Fig. 22 is a cross-sectional view as seen from line 22—22 in Fig. 19.
Fig. 24 is a fragmentary sectional view of a cam portion as seen from line 24—24 in Fig. 22.
Figure 23:
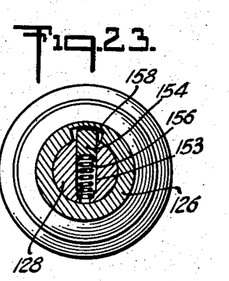
Fig. 23 is a cross-sectional view as seen from line 23—23 in Fig. 19.
Figures 25, 26, 27, 28, 29:
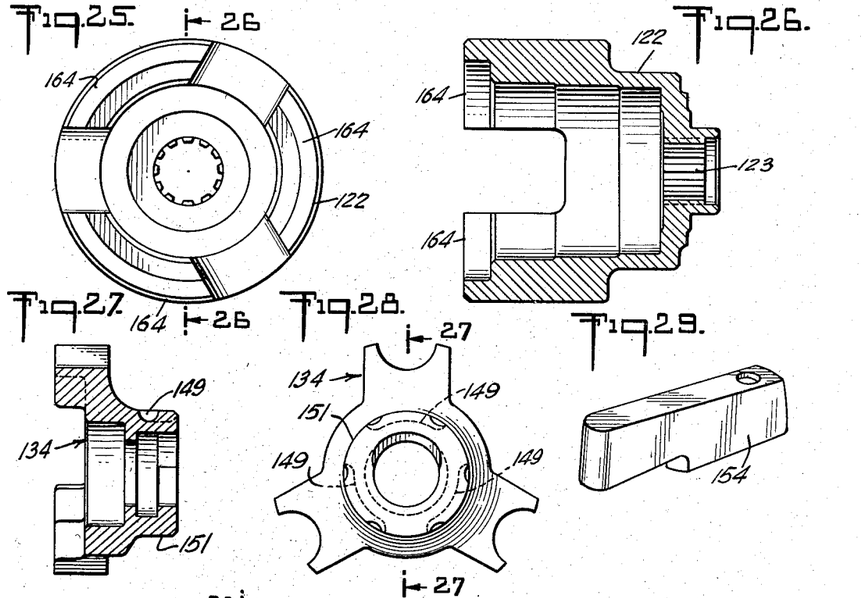
Fig. 25 is a view in elevation of the front face of a hammer element forming part of the impact clutch of the tool of Fig. 19.
Fig. 26 is a section view of the hammer element as seen from line 26—26 in Fig. 25.
Fig. 27 is a section view of a dog member forming part of the impact clutch of the tool of Fig. 19.
Fig. 28 is a view in elevation of the rear face of the dog member of Fig. 27.
Fig. 29 is an enlarged perspective view of a key element forming part of the impact clutch of the tool of Fig. 19.
Figure 30:
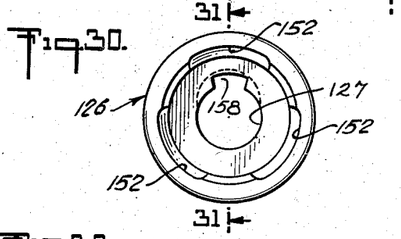
Fig. 30 is a view in elevation of the front face of a cam element used in the impact clutch of the tool of Fig. 19.
Figure 31:
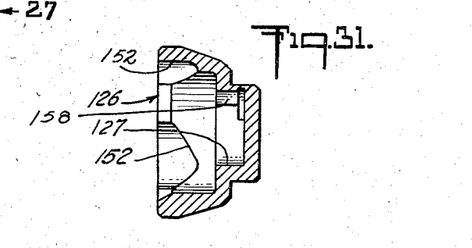
Fig. 31 is a section view of the cam element as seen from line 31—31 in Fig. 30.

The dog 134 is connected to the cam element 126 by way of a plurality of balls 148 which are arranged to ride in V-shaped cam grooves 149 (Fig. 27) formed on a hub 151 at the rear end of the dog, and V-shaped cam slots 152 formed on the inner part of the cam element 126. As best seen in Fig. 24, the apex of the V-shaped grooves 149 lie in a forward direction, while the apex of the V-shaped slots lie in the reverse direction. Within a slot 153 formed in the rear portion of the spindle, is a key 154 which is urged outwardly in a radial direction by means of a helical spring 156 compressively maintained between the underside of the key and the bottom of a bore 157 formed in the spindle. The key is arranged to engage a slot 158 formed in the cam element 126, when the parts are in alignment as shown in Fig. 23, while a camming groove 159 is arranged on the inner side of the dog hub 151 for forcing the key out of the slot 158 during a certain phase of clutch operation, as will later be discussed more fully hereinafter.

Figure 32:
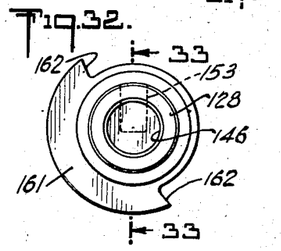
Fig. 32 is a front end view of a spindle as used in the impact clutch of the tool of Fig. 19.
Figure 33:
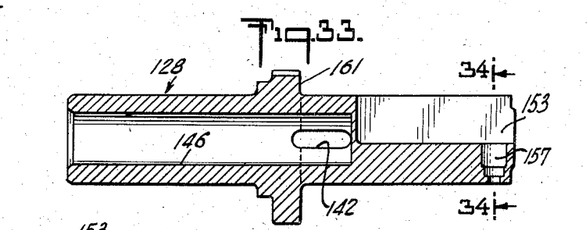
Fig. 33 is a section view of the spindle as seen from line 33—33 in Fig. 32.
Figure 34:
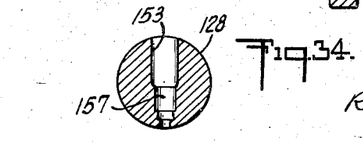
Fig. 34 is a cross-sectional view of a part of the spindle as seen from line 34—34 in Fig. 33.

The spindle 128 has a flange 161 (Figs. 32, 33) which is recessed to provide two shoulders 162 arranged to engage the sides of anvil jaws 137 whereby the spindle is coupled to the anvil to provide rotary motion thereto. It will be seen in Fig. 21, that the location of the shoulders 162 relative anvil jaws 137 is such as to provide a certain amount of free rotary movement of the spindle before engagement is made with the anvil jaws. The anvil 131 has a square cross-section shank 163 which is adapted to receive the socket 107 maintained thereon by means of the pin 108, the latter being kept in position by the rubber ring 109.

Hammer element 122 has three equi-spaced forwardly extending portions 164 (Fig. 26) which are adapted to inter-lockingly and slidingly receive the jaws 136 of the dog, as best seen in Fig. 21. The inter-locking engagement between the hammer element 122 and the dog 134 provides a forward end support for the hammer element, the rear end of the latter being supported by the bearing 61 as well as engagment with motor shaft 54.

Figures 35, 36:
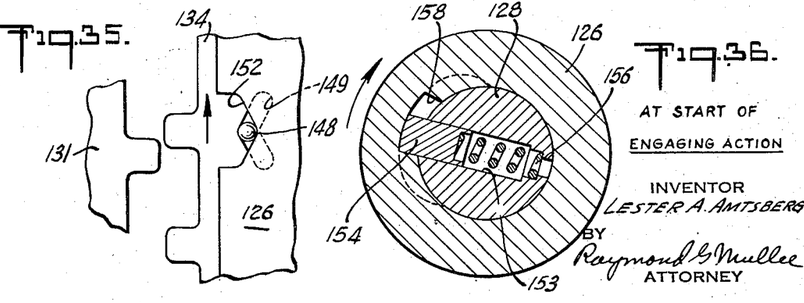
Figs. 35, 37, 39 and 41 are projected views illustrating the relationship of various parts of the impact clutch of the tool of Fig. 19 during different stages of operation as indicated.
Figs. 36, 38, 40 and 42 are enlarged cross-sectional views of the impact clutch similar to Fig. 23, and showing different relative positions of the parts thereof corresponding respectively with the stages illustrated in Figs. 35, 37, 39 and 41.

The operation of the impact clutch of Figs. 19–42 is as follows: the operator of the tool places the socket 107 in engagement with a threaded fastener such as a nut, the relative position of the parts of the tool being as shown in Fig. 19. Rotary motion of the motor shaft 54 is transmitted to the socket 107 by way of the hammer element 122, dog member 134, ball and cam arrangement 149, 148, 152, (Fig. 35) cam element 126, key and slot arrangement 154, 158 (Figs. 23 and 36), spindle 128, spindle shoulder 162 (Fig. 21), anvil jaws 137, and anvil 131. During the early stage of nut run-up, the resistance to rotation is relatively small and the tendency of the dog 134 to move forwardly upon the spindle 128 due to the ball and cam arrangement 149, 148, and 152, Fig. 24, is overcome by force of spring 144 acting against the dog by way of pin 143, bushing 139 and thrust washer 141.

Figures 37, 38:
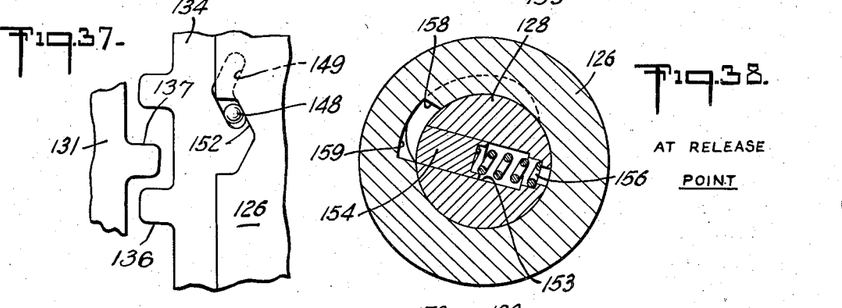
Figures 39, 40:
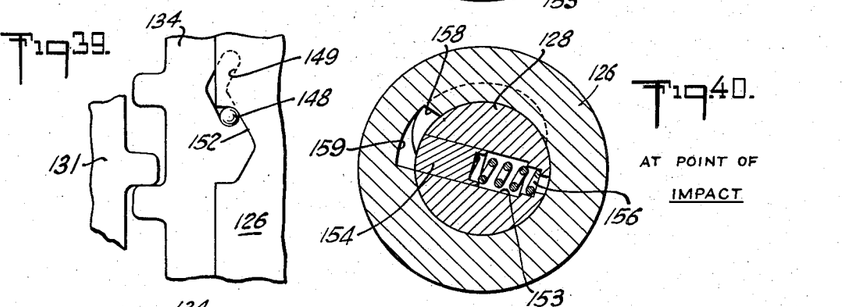
Figure 41:
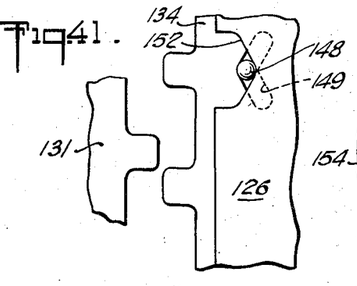
Figure 42:
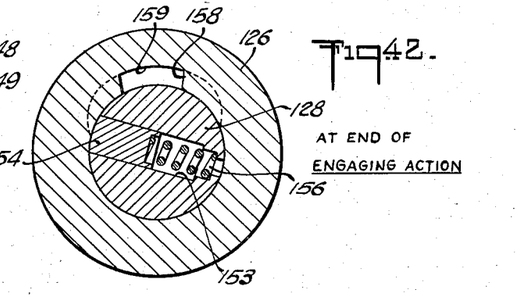

The condition above described (Figs. 35, 36) obtains until the resistance to rotation of the anvil rises toward the end of the nut run-up period. As a result of such increase in resistance to rotation, the balls 148, under influence of cam slot surfaces 152, act on the cam grooves 149 to cause the dog 134 to move forwardly upon the spindle 128 against the pressure of spring 144, thereby further compressing the latter and moving jaws 136 into the annular path of the jaws 137. During such forward motion of the dog, the cam arrangement further causes relative rotary motion of the dog relative to spindle, to the extent that the camming groove 159, acting upon the key 154, forces the latter out of engagement with the cam slot 158. Such action proceeds until the key is released from engagement with the slot 158 at which instant the jaws 136 and 137 are in almost full alignment for an impact as illustrated in Fig. 37.

At instant of impact the key 154 is free of slot 158 thereby relieving the spindle from the shock of impacting, the dog is brought to a sudden stop, thus arresting rotation of the hammer and motor and utilizing the kinetic energy of these parts to supplement the drive of the motor in delivery of impact to the anvil. Immediately subsequent to an impact blow the dog 134 and cam 126 are free to rotate in unison whereupon the spring 144 forces the dog rearwardly and the key 154 quickly is brought into engagement with the slot 158. The parts of the clutch are then established to begin another cycle resulting in the production of an impact blow being delivered to the anvil, said impacting cycle occuring once in every revolution of the hammer element. When the nut is set to the desired tightness, as determined by the judgment of the operator, the tool is removed from the nut and applied to the next work piece.

Figure 43:
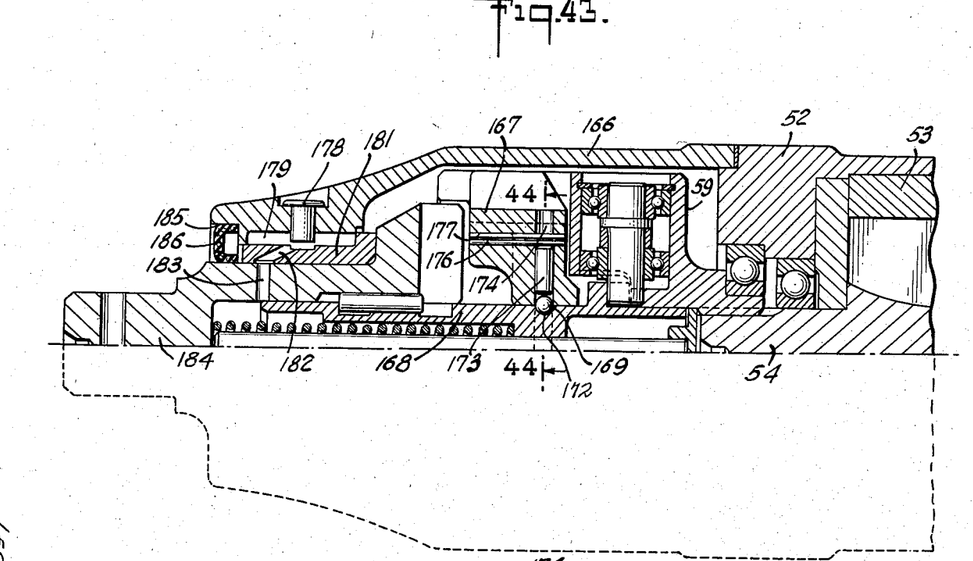
Fig. 43 is a partial longitudinal section view of another modification of the tool of Fig. 1, incorporating minor structural differences.

In Fig. 43 is illustrated a tool similar in structure and operation to the tool depicted in Figs 1 to 17, but with minor constructional differences relating to manner of mounting the dog member, and lubrication arrangement which will now be described. The tool of Fig. 43 has a casing 166 affixed to the motor housing 52, which encloses the motor 53. Motor shaft 54 is drivingly connected to the hammer element 59, which is engaged with a dog 167 rotatably mounted upon a spindle 168. The manner of mounting the dog 167 upon the spindle 168, is a feature distinguishing over the structure of the Fig. 1 to 17 embodiment, and consists of a plurality of balls 169 which ride in semicircular grooves 171 and 172 formed in the dog 167 and the spindle 168 respectively. The balls 169 are locked in the grooves by means of a pin 173 which is positioned in a radial bore 174 formed in the dog. A horizontally arranged keeper pin 176, located in an intersecting bore 177, maintains the pin 173 in position. By means of such arrangement, the dog 167 is free to rotate about the spindle 168, but can move in an axial direction only in conjunction with the spindle.

The lubrication arrangement of the tool of Fig. 43, includes a lubricant fitting 178 which is maintained in the nose portion of the casing 166. A reservoir 179 is arranged between the inner wall of the nose portion and a sleeve 181, from whence lubricant can flow through a hole 182 in the sleeve, to a hole 183 formed in tool anvil 184, then about the spindle 168. Positioned in a recess 185 formed in the nose portion of the casing 166, is a cup washer 186, which is arranged to maintain flexible contact with the anvil. In such manner an easily accessible and effective lubricating system is provided the tool. While the lubrication arrangement shown in Fig. 43 may be highly desirable in most of the impact wrenches of the invention, wherein frequent and extended use of the wrench is encountered, the devices shown in Figs. 1–17 and Figs. 19–42, in which no detailed lubrication means are shown, operate satisfactorily with but occasional lubrication. This is possible because of the low operational friction loss inherent in the design of the impact clutch of the invention.

Figure 44:
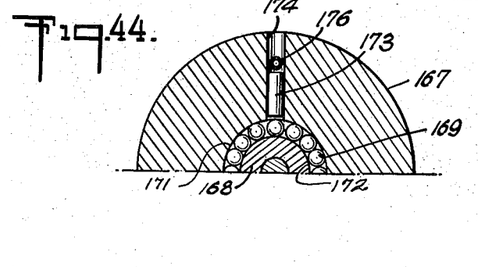
Fig. 44 is a cross section as seen from line 44—44 in Fig. 43.

The curve shown in Fig. 18 which has been applied to the embodiment shown in Figs. 1–17, is also applicable to the embodiment of the invention disclosed by Figs. 19–42, and also to the embodiment illustrated in Figs. 43–44.

What is claimed is:

1. An impact clutch comprising in combination a rotatable hammer, a dog carried by the hammer and slidably connected therewith and having one or more impact jaws, a rotatable anvil adapted for connection with a driven member and having one or more impact jaws, means adapted to transmit rotary motion of the hammer to the anvil in a continuous manner prior to realization of a predetermined torque load on the driven member and to cause impacting engagement of the impact jaw or jaws of the dog with the impact jaw or jaws of the anvil upon realization of predetermined torque load on the driven member said motion transmitting means including a rolling cam, and compression means to constantly urge the dog away from the anvil.

2. An impact clutch comprising in combination a rotatable hammer, a dog arranged for revolution coaxially with the hammer and slidably connected therewith and having a plurality of impact jaws, a spindle for the support of the dog, said spindle being connected to the anvil, means adapted to transmit rotary motion of the hammer to the anvil in a continuous manner via said spindle prior to realization of a predetermined torque load on the driven member and to cause impacting engagement of the impact jaws of the dog with the impact jaws of the anvil upon realization of predetermined torque load on the driven member said motion transmitting means including a rolling cam, and compression means to constantly urge the dog away from the anvil.

3. An impact clutch comprising in combination a rotatable hammer, a dog arranged for revolution coaxially with the hammer and slidably connected therewith and having one or more impact jaws, a rotatable anvil adapted for connection with a driven member and having one or more impact jaws, a spindle swivelly connected to the dog, said spindle having a cam portion and being further drivingly connected to the anvil, a cam means carried by the hammer which is arranged to engage the cam portion of the spindle whereby the latter is rotated prior to development of a predetermined torque load upon the driven member and further arranged to move the spindle axially for engagement of the impact jaw or jaws of the dog with the impact jaw or jaws of the anvil upon development of a predetermined torque load upon the driven member, and yieldable means arranged to constantly urge the spindle cam portion into engagement with the cam means of the hammer.

4. An impact clutch comprising in combination a rotatable hammer, a dog arranged for revolution coaxially with the hammer and slidably connected therewith and having a plurality of impact jaws, a rotatable anvil adapted for connected with a driven member and having a plurality of impact jaws, a spindle for the support of the dog, said spindle having a cam portion and being further drivingly connected to the anvil, a cam means carried by the hammer which is arranged to engage the cam portion of the spindle whereby the latter is rotated prior to development of a predetermined torque load upon the driven member and further arranged to move the spindle axially for engagement of the impact jaws of the dog with the impact jaws of the anvil upon development of a predetermined torque load upon the driven member, and yieldable means arranged to constantly urge the spindle cam portion into engagement with the cam means of the hammer.

5. An impact clutch according to claim 4, wherein the cam means comprises a roller which is rotatably supported in the hammer with its axis in a radial plane with respect to the axis of rotation of the hammer.

6. An impact clutch according to claim 5, wherein the cam portion of the spindle is of a single lobe type symmetrically arranged about an axial plane.

7. An impact clutch according to claim 6, wherein the crest of the cam on the spindle is arranged to be clear of the roller at instant of impact of the jaws of the dog with the jaws of the anvil.

8. An impact clutch according to claim 7, wherein the dog is supported upon the spindle for relative rotational movement.

9. An impact clutch according to claim 8, wherein a thrust rod is arranged concentric with the spindle and between the anvil and a spline portion formed with the hammer, to restrict rearward movement of the anvil.

10. An impact clutch according to claim 9, wherein each of the impact jaws of the dog are arranged to be substantially in simultaneous engagement with each of the respective mating jaws of the anvil at instant of impact.

11. An impact clutch comprising a rotatable anvil having one or more impact receiving jaws, a rotatable hammer dog movable toward and away from the anvil, one or more impact delivering jaws on said dog movable into and out of the annular path of rotation of said anvil jaw or jaws, automatic means for moving the dog in a declutching direction away from the anvil, reclutching means for positively moving the dog toward the anvil to deliver a rotational impact, said reclutching means including a cam mechanism for moving the dog, said cam mechanism comprising a pair of coperating cam elements having rolling engagement therebetween to minimize friction, the dog being supported on a hammer element of substantial inertia for rotation in unison therewith, but having independent movement relative to the hammer element in a declutching and reclutching direction, said dog and hammer element forming a hammer assembly, the driving element of the cam mechanism being carried by the hammer assembly in its rotation, the driven element of the cam mechanism being carried by a spindle which supports the dog, characterized by a key means carried by the spindle for locking the driven cam element to the spindle for rotary motion therewith.

12. An impact clutch according to claim 11, wherein the driven cam element is slotted to receive the key means whereby the driven cam element is locked to the spindle for rotation therewith.

13. An impact clutch according to claim 12, wherein a spring is compressively maintained beneath the key and the spindle to urge the key outwardly in a radial direction.

14. An impact clutch according to claim 13, wherein a cam surface is provided in the dog which is arranged to move the key out of the slot in the cam element so that the cam element is unlocked from the spindle.

15. An impact clutch according to claim 14, wherein the spindle has a longitudinal slot containing a pin member the ends of which project from the slot and are in engagement with the dog, said resilient means abutting the pin member whereby the compressive effort of the resilient means is applied to the dog.

16. An impact clutch according to claim 15, wherein the operative elements of the clutch are made symmetrical so that the clutch will function equally well in either direction of rotation.

17. An impact clutch comprising a rotatable shaft adapted to be driven by a motor, a hammer driven by said shaft and having a rigid driving connection therewith, a dog carried by said hammer and having one or more impact jaws, an anvil coaxially rotatable with the hammer and having one or more impact jaws arranged to be struck by the dog, said dog being movable toward and from the anvil to deliver a succession of rotary impacts thereto, a spindle coaxially rotatable with the anvil and supported for relative reciprocation therein, the dog being swivelly mounted on the spindle for reciprocation in unison with the spindle, and a set of driving and driven cams for effecting positive movement of the dog toward the anvil, the driving cam being rotatable in unison with the shaft and hammer and the driven cam being carried by the spindle.

18. An impact clutch according to claim 17 in which the spindle has a lost motion driving connection with the anvil.

19. An impact clutch comprising a rotatable anvil having one or more impact receiving jaws, a rotatable hammer assembly including a hammer element of substantial mass and a dog carried by the hammer element in unison therewith, said dog having independent movement relative to the hammer element toward and away from the anvil, one or more impact delivering jaws on said dog moving into and out of the annular path of rotation of said one or more anvil jaws, automatic means for moving the dog in a declutching direction away from the anvil, and reclutching means for positively moving the dog toward the anvil to deliver a rotational impact, characterized in that said reclutching means comprises a roller carried and supported by the hammer element and engaging a cam carried substantially along with the anvil in its rotation, said cam being movable toward and away from the anvil.

20. An impact clutch comprising a rotatable shaft adapted to be driven by a motor, a hammer driven by said shaft and having a rigid driving connection therewith, a dog carried by said hammer and having one or more impact jaws, an anvil coaxially rotatable with the hammer and having one or more impact jaws arranged to be struck by the dog, said dog being movable toward and from the anvil to deliver a succession of rotary impacts thereto, a spindle coaxially rotatable with the anvil and supported for relative reciprocation therein, the dog being swivelly mounted on the spindle for reciprocation in unison with the spindle, and means driven by the shaft and acting through the spindle independently of the jaws to drive the anvil during the interval between impacts.

21. An impact clutch comprising a rotatable hammer and a rotatable anvil, means for driving the hammer, successively disengageable and re-engageable impact jaws carried by said hammer and anvil respectively, means for causing disengagement of said jaws, means for automatically effecting re-engagement of said jaws, said re-engagement means comprising a cam element carried by the hammer and having rolling engagement with a cam element carried by the anvil, and yieldable means opposing said re-engagement means for holding the cam elements in continuous engagement to cause the hammer to impart a continuous rotative drive to the anvil independent of the jaws under certain conditions of operation.

22. An impact clutch comprising a rotatable anvil having one or more impact receiving jaws, a rotatable hammer dog movable toward and away from the anvil, one or more impact delivering jaws on said dog movable into and out of the annular path of rotation of said anvil jaw or jaws, automatic means for moving the dog in a declutching direction away from the anvil, reclutching means for positively moving the dog toward the anvil to deliver a rotational impact, said reclutching means comprising a pair of cooperating cam elements having rolling engagement therebetween to minimize friction, and yieldable means opposing said reclutching means for holding the cam elements in continuous engagement to cause the hammer to impart a continuous rotative drive to the anvil independent of the jaws under certain conditions of operation.

23. An impact clutch according to claim 22, in which the dog is supported on a hammer element of substantial inertia for rotation in unison therewith, but has independent movement relative to the hammer element in a declutching and reclutching direction, said dog and hammer element forming a hammer assembly, characterized in that the driving element of said pair of cooperating cam elements is carried by the hammer assembly in its rotation.

24. An impact clutch according to claim 23, characterized in that the driven element of said pair of cooperating cam elements is carried by a spindle which supports the dog.

25. An impact clutch comprising a rotatable anvil having one or more impact receiving jaws, a rotatable hammer dog movable toward and away from the anvil, one or more impact delivering jaws on said dog movable into and out of the annular path of rotation of said anvil jaw or jaws, automatic means for moving the dog in a declutching direction away from the anvil jaw path, and reclutching means for positioning the dog to deliver a rotational impact, said reclutching means comprising a pair of cooperating cam elements having rolling engagement therebetween to minimize friction and arranged to positively move the dog toward the anvil jaw path by means of such rolling engagement, one of said cam elements having a lost motion connection with the anvil, and being driven by the other of said cam elements.

26. An impact clutch according to claim 24 in which the spindle has a lost motion driving connection with the anvil and in which the driving cam element comprises a roller rotatable about an axis transverse to the axis of rotation of the hammer assembly, said roller being engageable at times with a portion of the driven cam element to turn the spindle with lost motion in one direction relative to the anvil, and being engageable at other times with another portion of the driven cam element to turn the spindle with lost motion in the opposite direction relative to the anvil.

References Cited in the file of this patent

UNITED STATES PATENTS

| | | |
|---|---|---|
| 2,160,150 | Jamerson et al. | May 30, 1939 |
| 2,220,711 | Fitch | Nov. 5, 1940 |
| 2,563,711 | Fitch | Aug. 7, 1951 |

FOREIGN PATENTS

| | | |
|---|---|---|
| 480,443 | Italy | Apr. 27, 1953 |